Figure 3:
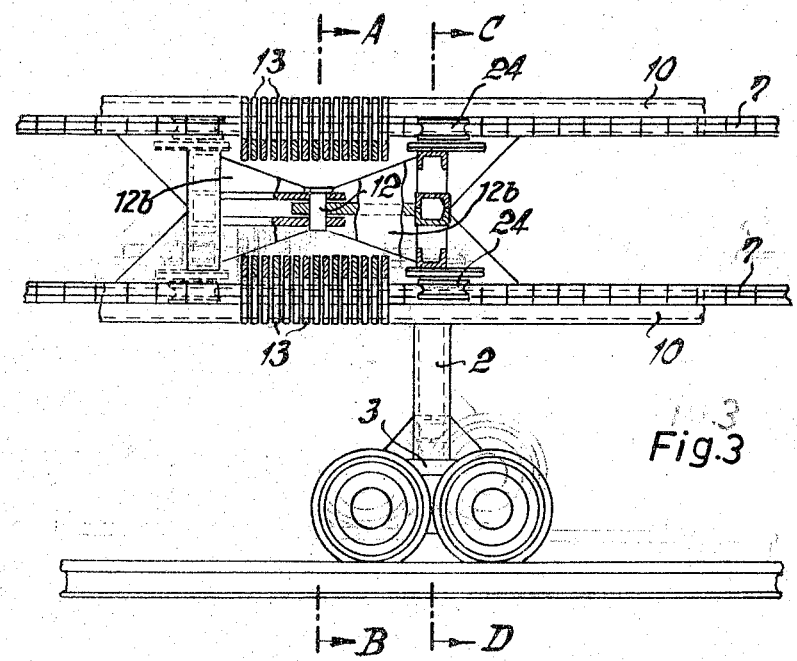

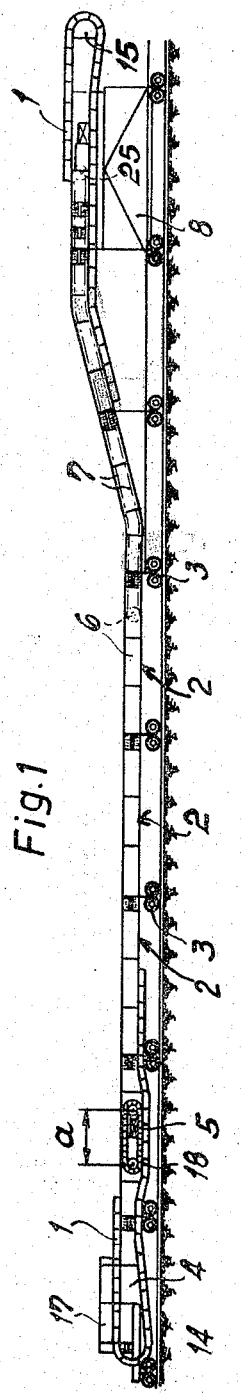

March 7, 1967 H. KELLER ETAL 3,307,493
CONVEYOR
Filed May 18, 1965 4 Sheets-Sheet 2

INVENTORS:
Heinrich KELLER
Karl-Werner BRETZ

BY

Michael J. Striker
their ATTORNEY

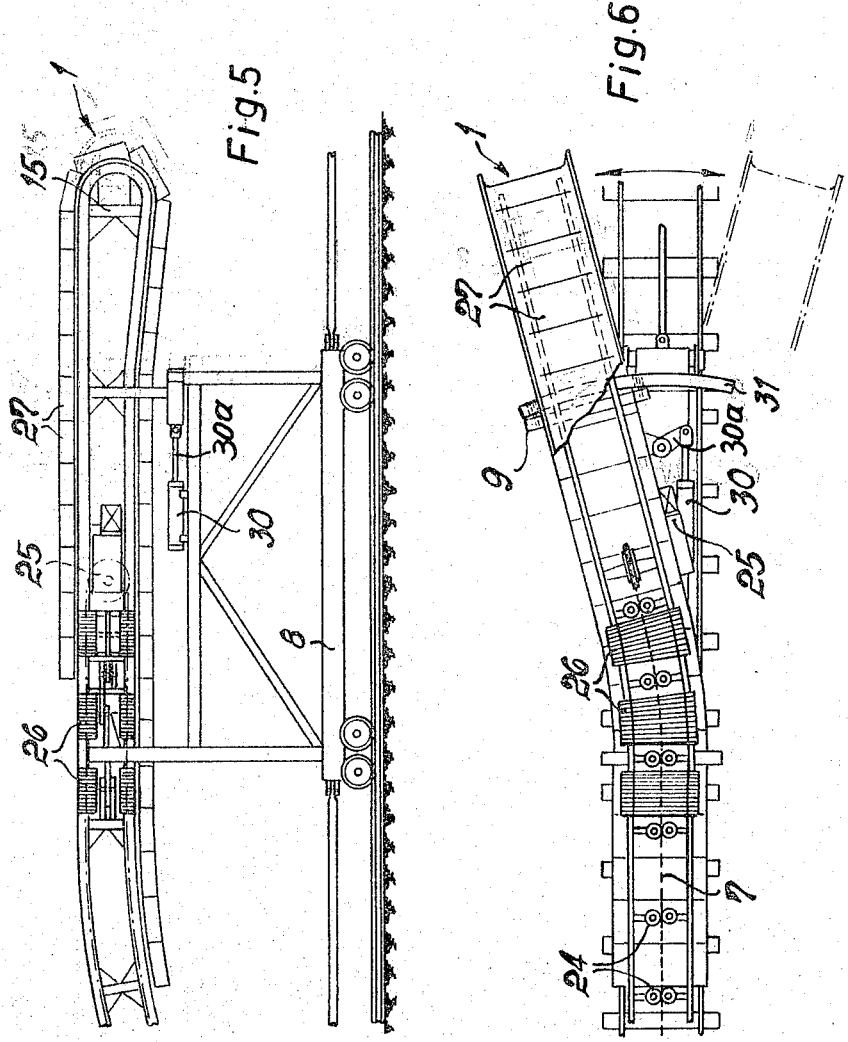

United States Patent Office 3,307,493
Patented Mar. 7, 1967

3,307,493
CONVEYOR
Heinrich Keller, Salzgitter-Bad, Germany, and Karl-Werner Bretz, Les Epineys, Martigny-Bourg, Switzerland, assignors to Salzgitter Maschinen Aktiengesellschaft, Salzgitter-Bad, Germany
Filed May 18, 1965, Ser. No. 456,678
Claims priority, application Germany, May 22, 1964,
S 91,175
17 Claims. (Cl. 104—72)

The present invention relates to conveyors in general, and more particularly to improvements in conveyors of the type which may be utilized to load earth, ore, coal, rock or other bulk material such as must be removed in building of tunnels, railroads, roadways, in surface or underground mining and the like. Still more particularly, the invention relates to an improved conveyor which is especially suited for delivering bulk material into railroad cars, dollies and similar conveyances.

In known conveyors of this general character, a material transporting band is mounted for travel in an endless path which is located in a vertical plane. The band can move lengthwise but it cannot be deflected laterally so that the conveyor cannot travel in an arcuate path. Thus, any bulk material which is adjacent to or accumulates in a curved portion of a tunnel, mine or roadway must be loaded directly into a freight car because the bands of such conventional conveyors are incapable of collecting or unloading material along a bend. This will explain why the just described conventional conveyors failed to gain widespread acceptance in mining, tunnel-building, road-building and railway-building industries.

Accordingly, it is an important object of the present invention to provide a conveyor for loading and unloading earth or similar bulk material and to construct the conveyor in such a way that it can travel in an arcuate and/or straight path, that its material-transporting bands can share such movements, and that the bands can receive and/or unload bulk material while the conveyor comes to a halt in a straight and/or arcuate portion of its track.

Another object of the invention is to provide a novel system of bands and a novel drive for such bands which may be utilized in a conveyor of the just outlined characteristics.

A further object of our invention is to provide novel loading and unloading devices which may be utilized in the improved conveyor.

An additional object of the invention is to provide a novel supporting structure for the bands in a conveyor of the above outlined characteristics and to construct the supporting structure in such a way that it can properly guide, support and otherwise control the bands while it moves along a horizontal, inclined, straight and/or arcuate portion of the track in a mine or tunnel or along a roadway or railway.

A concomitant object of the invention is to provide a conveyor which will automatically fill to capacity each of a series of consecutive freight cars and wherein the material which is to be transported in such cars is delivered thereto in accurately metered quantities.

Still another object of the invention is to provide a conveyor whose bands can alternately fill cars of two separate trains and wherein the bands can be advanced at intervals of such length that an empty freight car can be moved to receiving position in good time to take up the next batch of bulk material.

An additional object of the invention is to provide a conveyor wherein the bands may be loaded without interruptions despite the fact that the material is discharged at intervals.

A further object of the invention is to provide a conveyor wherein the bands can be driven at different speeds.

Briefly stated, one feature of our invention resides in the provision of a conveyor for delivering earth, rock, ore, coal or other bulk material into freight cars and similar conveyances. The conveyor comprises a train of articulately coupled supporting frames, a wheel-mounted carriage supportingly connected with one end of each frame so that the frames can swivel with reference to their carriages, tracks for the wheels of such carriages, resilient buffers provided between the adjoining frames and preferably including packages of laminated or dished springs which allow the frames to swivel with reference to their carriages, guide means mounted on the frames and together defining an endless path having an upper and a lower run and two end turns, loader and unloader means provided at the opposite end turns of the endless path, and drive means for advancing the bands along the lower run, past the loader means, along the upper run and past the unloader means so that bulk material accumulating on the bands during travel past the loader means may be dicharged into consecutive conveyances during travel of bands past the unloader means.

Each band preferably accommodates a quantity of bulk material which suffices to fill a conveyance, and the drive means for the bands preferably comprises a slower unit for moving the bands past the loader means and a faster unit for moving the bands past the unloader means.

The unloader means preferably includes a swingable assembly whose discharge end is located at a level above the conveyances and which can be swung laterally so that the unloader means may deliver material to freight cars at either side of the rails for the carriages.

Figure 4:
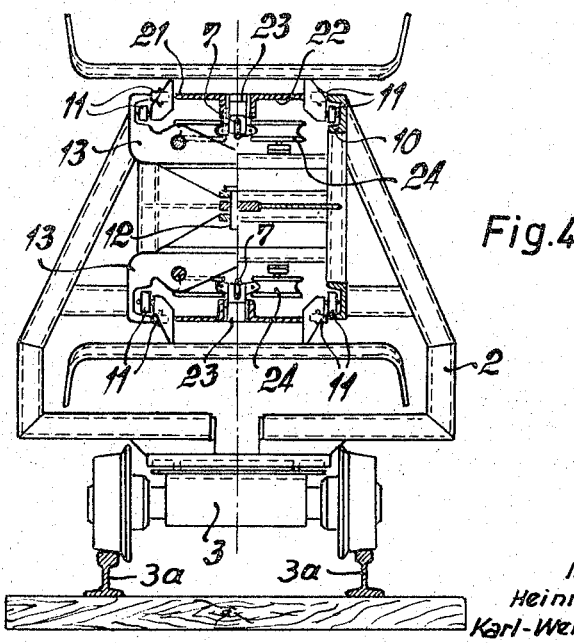
Figure 7:
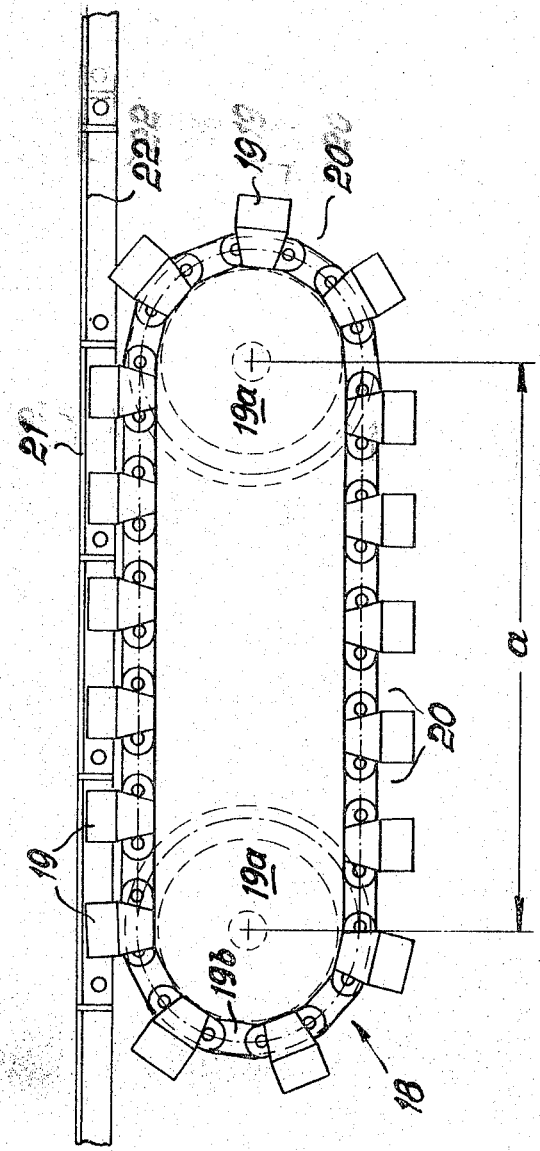

The novel features which are considered as characteristic of the invention are set forth in particular in the appended claims. The improved conveyor itself, however, both as to its construction and its mode of operation, together with additional features and advantages thereof, will be best understood upon perusal of the following detailed description of a specific embodiment with reference to the accompanying drawings, in which:

FIG. 1 is a side elevational view of the conveyor;
FIG. 2 is a top plan view of the conveyor;
FIG. 3 is a larger-scale fragmentary side elevational view of two adjoining supporting frames for the bands;
FIG. 4 is a composite transverse vertical section as seen in the direction of arrows from the lines A–B and C–D of FIG. 3;
FIG. 5 is an enlarged side elevational view of the unloading station;
FIG. 6 is a top plan view of the unloading station; and
FIG. 7 is an enlarged side elevational view of a first drive unit which is utilized to advance the bands past and beyond the loading station.

Referring to FIGS. 1 and 2, the conveyor of our invention comprises a train of interconnected supporting frames 2 which are provided with means for guiding a series of elongated apron-type material-transporting bands 1. Each frame 2 is free to swivel with reference to a wheel-mounted carriage 3 whose wheels travel on rails 3a best shown in FIG. 4. A loader vehicle 4 is provided at one end of the conveyor (i.e., at the left-hand end, as viewed in FIGS. 1 and 2), and this loader is adjacent to a first drive unit 5 which serves to advance the bands 1 in a portion of an endless path defined by suitable guide means on the interconnected frames 2. An intermediate frame 2 carries an idler sprocket 6 for an endless unloading chain 7 which extends toward but short of the right-hand end of the conveyor and along the platform of an unloatder vehicle 8 which latter is provided with a swinging or deflecting assembly 9 adapted to direct bulk material by gravity feed into one of two rows of railroad cars 16 shown in FIG. 2. Each row of such cars is adjacent to one side of the train of frames 2 and the wheels of the cars 16 travel along pairs of rails 28, 29.

Referring to FIGS. 3 and 4, each supporting frame 2 comprises upper and lower longitudinally extending horizontal beams 10 which support guide rollers 11 for the sections or aprons of the bands 1. Each carriage 3 is adjacent to one end of the respective frame 2 and the articulate connections between the adjoining ends of the frames 2 comprise vertical pivots 12. The upper and lower beams 10 are resiliently coupled to each other by buffers including fan-shaped packages 13 of leaf springs or dished springs which allow the interconnected frames to turn with reference to each other, i.e., each such frame can swivel about the vertical axis of the respective carriage 3 and about the vertical axis of the corresponding pivot pin 12. The pins 12 extend through registering apertures provided in brackets 12a which are mounted at each end of each frame 2. The packages 13 are of particular advantage in underground mining and each thereof has a configuration which conforms to the shape of the track for the frames 2.

The loader 4 is adjacent to a reversing drum 14 which is located at the left-hand end turn of the endless path for the bands 1 and serves to direct the bands from the lower run to the upper run of their endless path. A similar reversing drum 15 is provided on the unloader 8 at the right-hand end turn of the conveyor. It is preferred to select the length of the individual bands 1 in such a way that each thereof can support and advance a quantity of earth, ore, coal, rock or other bulk material which fills a railroad car 16. In other words, each band can transport a quantity of bulk material which is just sufficient to properly fill one of the cars, either to capacity or to less than full capacity. The bands 1 are loaded with material which is fed continuously through a chute 17 extending upwardly from the loader 4, and such loading takes place while the corresponding band 1 advances from the lower run, around the drum 14, and onto and along the upper run of the endless path defined by the train consisting of interconnected frames 2. The machine which delivers material into the chute 17 may be a bulldozer, a shovel, or the like (not shown).

During loading, the bands 1 are driven at a relatively low speed, and such movement is imparted by the first drive unit 5 which is adjacent to the loader 4. The motion transmitting connection between the first drive unit 5 and the bands 1 preferably comprises a magnetic chain and tooth arrangement 18 which is shown in FIG. 7. This arrangement 18 includes two sprocket drums or two pairs of coaxial sprockets 19a and two endless link chains 19b which are trained around the respective sprockets 19a and whose links carry teeth in the form of permanent magnets 19. The magnets 19 are separated from each other by gaps 20, and the reference character $a$ indicates the distance between the axes of the front and rear sprockets 19a. An important advantage of the gaps 20 is that they allow for descent of bulk material which happens to fall between the links of the chains 19b so that the drive unit 5 is very unlikely to become clogged with coal, ore or earth. The bands 1 are assembled of sections or aprons 21 which consist of paramagnetic material and slide along the rollers 11. A section 21 which is adjacent to the chains 19b will be attracted by the magnets 19 and will advance when the chains 19b are driven whereby the bands 1 travel toward the lower part of the drum 14 at the left-hand end turn of the conveyor. FIG. 7 shows that the underside of each section 21 is provided with recesses 22 which receive one or more magnets 19 at a time. The ends of each band 1 carry permanent magnets 23 which are disposed between inverted U-shaped or channel-shaped portions of the sections 21. The magnets 23 of such bands which are located in the right-hand half of the conveyor will adhere to the links of the unloading chain 7 which is trained around and is guided by rollers 24 provided on the frames 2. The unloading chain 7 forms part of a second drive unit 25, and its speed exceeds the speed of the chains 19b. In other words, the bands 1 which are advanced by the unloading chain 7 will move faster than the bands which are advanced by the chains 19b. FIG. 1 merely shows two bands 1, but it will be readily understood that the conveyor normally comprises a large number of such bands.

The deflecting assembly 9 on the unloader 8 comprises a swingable arm 27 whose components are connected to each other by packages 26 of laminated springs or the like and which can swivel about a vertical axis so as to move the drum 15 to a level above an empty car 16. The intervals $t_p$ between loading of consecutive cars 16 are long enough to allow for advancing the one or the other row of cars by a step so that an empty car is in requisite position to receive a batch of bulk material at the time the next loaded band 1 reaches the drum 15 at the rightmost end of the conveyor. The swingable arm 27 is guided by arcuate ways 31 and may be moved by a fluid-operated cylinder 30 through a suitable linkage 30a shown in FIGS. 5 and 6.

The distance between the first drive unit 5 and the idler sprocket 6 of the second drive unit 25 at most equals the length of a band 1 so that each band which is located between the two drive units is operatively connected with the chains 19b or with the chain 7. Also, the distance between the right-hand end of the chain 7 and the right-hand end turn of the conveyor (drum 15) at most equals half the length of a band 1 so that each band which extends around the drum 15 is operatively connected with the upper or lower stringer of the chain 7. The bands which travel from the idler sprocket 6 toward and past the unit 5, around the drum 14, below the chute 17 of the loader 4 and along the upper stringers of the chains 19b form a continuous carpet so that the loader 4 can operate on a continuous basis. On the other hand, the difference in the speed of the chains 19b and 7 suffices to stagger the bands along the upper stringer of the chain 7 and around the drum 15 to such an extent that the intervals $t_p$ between the unloading of material from consecutive bands suffice to bring an empty freight car 16 into requisite position below the drum 15 and to swing the arm 27 so that the bands will alternately discharge their loads into empty cars 16 on the rails 28 and 29.

Since the beams 10 perform the dual function of strengthening the frames 2 and supporting the rollers 11 for the bands 1, the construction of the frames is exceptionally simple. Also, and because each carriage 3 is adjacent to one end of the respective frame 2, the train of such frames can readily travel in a curve but is sufficiently stable to constitute a satisfactory support for the bands 1.

The improved conveyor is operated as follows:

The sprockets 19a are driven by a motor or the like, not shown, whereby the magnets 19 of the chains 19b engage the adjacent band sections 21 and transport the bands 1 around the drum 14 and below the chute 17 so that each such band receives a predetermined quantity of bulk material which is sufficient to fill one of the cars 16. Once a loaded band 1 reaches the left-hand end turn of the unloading chain 7 (see the idler sprocket 6), its front magnet 23 is attracted to the links of this unloading chain and causes the band to advance at a higher speed. The band travels along the upper stringer of the unloading chain 7 and toward the right-hand reversing drum 15. During its travel around the drum 15, the band discharges its load by gravity into the nearest car 16 and thereupon advances along the lower stringer of the unloading chain 7 toward the first drive unit 5. Once it has moved beyond the idler sprocket 6, an empty band 1 comes to a halt and advances only in response to pressure transmitted by the next-following band 1 which is still attracted to the lower stringer of the unloading chain 7. Thus, the bands 1 which are located between the idler sprocket 6 and the first drive unit 5 will form a continuous file or carpet which advances intermittently, i.e., whenever the last band of this carpet is engaged by that band which is still entrained by the lower stringer of the unloading chain 7 but is in the process of moving past and beyond the idler sprocket 6. If the carpet of end-to-end arranged bands 1 is so long that its rearmost band or bands will extend to the right of the idler sprocket 6, such rearmost band or bands will skid with reference to the unloading chain 7 which continues to advance at a relatively high speed such as is best suited for proper unloading of material into the cars 16. In other words, once a band which is adjacent to the lower stringer of the unloading chain 7 is prevented from advancing at the exact speed of this chain, the magnet or magnets 23 will allow the unloading chain 7 to continue its movement while the band comes to a standstill or advances at a speed which is less than that of the chain 7. At the same time, the bands which are located in the upper run of their endless path (i.e., those bands which advance along the upper beams 10) will move away from each other as soon as they reach the idler sprocket 6 and the left-hand turn of the upper stringer of the unloading chain 7. This will be readily understood by bearing in mind that the first drive unit 5 is slower than the second drive unit 25 which includes the unloading chain 7. If the speed of the chains 19b is $V_b$, if the speed of the unloading chain 7 is $V_n$, and if the length of a band 1 is L, the distance A between the bands 1 which travel along the upper stringer of the unloading chain 7 can be expressed by the formula $$A = \frac{V_n}{V_b} L \cdot L$$

The unloading chain 7 will receive bands 1 at intervals $t_1$ whereby the length of each interval $$t_1 = \frac{L}{V_b}$$

and the time $t_2$ necessary for unloading the material from a band 1 is $$t_2 = \frac{L}{V_n}$$

The length of intervals $t_p$ between arrival of consecutive loaded bands 1 at the unloading station can be expressed by the formula $$t_p = t_1 - t_2 = L\left(\frac{1}{V_b} - \frac{1}{V_n}\right)$$

Since the bands consist of articulately connected sections 21, they can advance along a bend, such as the bend shown at the right-hand end of the conveyor shown in FIG. 2.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

Conventional conveyors of the type to which the present invention pertains are described and illustrated in the following German patent specifications: Nos. 957,642, 1,081,375 and 1,127,795.

What is claimed as new and desired to be secured by Letters Patent is:

1. In a conveyor for delivering bulk material into freight cars or similar conveyances, a train of articulately coupled supporting frames; a carriage supportingly connected with each of said frames so that the frames can swivel with reference to their carriages; resilient buffers provided between the adjoining frames; guide means mounted on said frames and together defining an endless path having an upper and a lower run and two end turns; a plurality of flexible material transporting bands of finite length arranged to advance along said path; loader and unloader means provided at the opposite end turns of said path; and drive means for advancing the bands along said lower run, past said loader means, along said upper run and past said unloader means so that material accumulating on the bands during travel past said loader means can be discharged into consecutive conveyances during travel of bands past said unloader means, the combined length of said bands being less than the total length of said path.

2. A structure as set forth in claim 1, wherein the combined length of said bands is less than the length of said path and wherein said drive means comprises a first unit for advancing the bands past said loader means at a relatively low speed and a second unit for advancing the bands past said unloader means at a higher speed so that bands form a continuous carpet when advanced by said first unit but are spaced from each other when advanced by said second unit.

3. A structure as set forth in claim 2, wherein each of said bands comprises sections consisting of para-magnetic material and wherein said first unit comprises travelling magnets which entrain the sections when the first unit is in operation.

4. A structure as set forth in claim 2, wherein the distance between said units at most equals the length of a band and wherein the second unit comprises an endless chain which advances the bands toward and past said unloader means.

5. A structure as set forth in claim 4, wherein said chain comprises upper and lower stringers respectively extending along the upper and lower runs of said path but short of that end turn which is adjacent to said unloader means, and wherein the distance between said stringers and said last named end turn at most equals one-half the length of a band.

6. A structure as set forth in claim 1, wherein said unloader means is located at a level sufficiently above the ground to allow for discharge of material into consecutive conveyances by gravity feed.

7. A structure as set forth in claim 6, wherein said unloader means comprises an assembly which is swingable about a vertical axis so that the respective end turn of said path may be moved to a level above an empty conveyance at either side of said train.

8. A structure as set forth in claim 7, wherein said unloader means further comprises fluid-operated cylinder means for swinging said unit about said vertical axis.

9. In a conveyor for delivering earth or other bulk material into freight cars and similar conveyances, a train of supporting frames; pivot means articulately coupling the ends of frames to each other; a carriage supportingly connected to one end of each frame so that the frames can swivel with reference to their carriages; resilient buffers comprising packages of springs provided between the adjoining frames to bridge the gaps between such frames when said train advances along an arcuate track; guide means provided on said frames and defining an endless path having an upper run, a lower run and two end turns; and material-transporting flexible band means of finite length mounted on said guide means for travel in said path.

10. A structure as set forth in claim 9, wherein said band means comprises a plurality of bands of finite length and further comprising drive means for advancing the bands in said path, said drive means comprising a first unit for advancing the bands at a lower speed along one of said end turns and a second unit for advancing the bands at a higher speed along the other end turn of said path so that the bands are nearer to each other when driven by said first unit but are spaced from each other when driven by said second unit; loader means provided at said one end turn; and unloader means provided at said other end turn.

11. A structure as set forth in claim 10, wherein said first unit comprises endless chain means provided with magnets and each of said bands comprises sections consisting of paramagnetic material which are attracted by the magnets when the belts are driven by said first unit.

12. A structure as set forth in claim 10, wherein the maximum distance between said units at most equals the length of a band and wherein said second unit is spaced from said other end turn by a distance which at most equals half the length of a band, said second unit comprising an endless unloading chain.

13. A structure as set forth in claim 10, further comprising rails extending along at least one side of said train and a series of freight cars on said rails, each of said bands being arranged to transport a quantity of bulk material which suffices to fill one of said freight cars.

14. A structure as set forth in claim 13, wherein said second unit is arranged to advance the bands at intervals of such length that an empty car can be moved to receiving position subsequent to evacuation of material from a preceding band but prior to evacuation of material from the next-following band, the length of said intervals being determined by the difference in speeds of bands which are respectively advanced by said first and second units.

15. A structure as set forth in claim 10, wherein the bands driven by said first unit form a continuous carpet while advancing past said loader means.

16. A structure as set forth in claim 15, wherein said other end turn is located at a higher level than the remainder of said path and wherein said unloader means comprises a portion which is swingable about a vertical axis so that said other end turn may be displaced laterally of the remainder of said path.

17. A structure as set forth in claim 16, further comprising packages of laminated springs connecting said swingable portion with the remainder of said unloader means.

References Cited by the Examiner
UNITED STATES PATENTS

| | | | |
|---|---|---|---|
| 1,207,237 | 12/1916 | Stuart | 214—41 |
| 2,543,368 | 2/1951 | Jones | 198—109 |
| 2,670,836 | 3/1954 | Ball | 198—76 |
| 2,836,283 | 5/1958 | Horth | 198—109 |
| 2,850,147 | 9/1958 | Hill | 198—109 |

FOREIGN PATENTS 785,845  12/1957  Great Britain.

EVON C. BLUNK, *Primary Examiner.*

EDWARD A. SROKA, *Examiner.*